United States Patent Office 3,642,848
Patented Feb. 15, 1972

3,642,848
REACTION PRODUCTS OF DIALKYLTIN OXIDES AND HIGHER DIALKYLTIN MONOHYDRIC ALIPHATIC SATURATED ALCOHOL ESTERS OF THIOMALIC AND THIOLACTIC ACIDS
Lawrence R. Brecker, Brooklyn, and Alfred Thee, Long Beach, N.Y., assignors to Argus Chemical Corporation, Brooklyn, N.Y.
No Drawing. Filed Jan. 3, 1969, Ser. No. 788,916
Int. Cl. C07f 7/22; C08f 45/62
U.S. Cl. 260—429.7
10 Claims

ABSTRACT OF THE DISCLOSURE

Reaction products of higher dialkyltin oxides and higher dialkyltin monohydric aliphatic saturated alcohol esters of thiomalic and thiolactic acid are provided, that are excellent stabilizers for polyvinyl chloride resins.

---

This invention relates to reaction products of higher dialkyltin oxides and higher dialkyltin monohydric saturated aliphatic alcohol esters of thiomalic and thiolactic acids, and to stabilizer compositions for polyvinyl chloride resins containing such reaction products, as well as polyvinyl chloride resin compositions containing such reaction products as stabilizers.

Organotin mercaptocarboxylic acid esters because of their advantageous properties are now widely used as stabilizers for polyvinyl chloride resins. However, they do have certain disadvantages. Frequently, they are ineffective in imparting resistance to the development of early discoloration, although they may be quite effective from the standpoint of long term stabilization. Moreover, they may impart an unpleasant mercaptide odor to the resin. Because they are liquids and have a relatively low tin content, if they are used in large amounts in rigid polyvinyl chloride resin compositions, they may reduce the softening point of the polymer.

Canadian Pat. No. 794,373, dated Sept. 10, 1968, describes reaction products of organotin mercaptocarboxylic acid esters and organotin oxides or sulfides or hydrocarbyltin stannoic or thiostannoic acid or esters. It is indicated that the organotin oxide or sulfide reacts with the carboxylic acid groups, and that because of this, there is a minimum spacing between the —Sn—S— and the carboxylate groups before reaction will take place. This spacing requires an alkylene group of the mercaptoacid that has at least two carbon atoms. Thus, the alpha-mercapto acids do not undergo the reaction, thus excluding the least expensive and most commonly used of the organotin mercaptocarboxylic acid esters, the thioglycolate esters.

In accordance with the instant invention, it has been determined that higher dialkyltin oxides and higher dialkyltin monohydric aliphatic saturated alcohol esters of thiolactic acid and thiomalic acids, both alpha-mercaptocarboxylic acids, react to form homogeneous liquids that are compatible with polyvinyl chloride resins, and that are excellent stabilizers therefor, imparting good long term stability as well as superior resistance to the development of early discoloration, superior, in fact, both to the dialkyltin oxides and to the dialkyltin thiolactic and thiomalic acid esters, taken separately. The fact that this reaction takes place at all is evidently due to some unknown critical structural relationship between the dialkyltin oxides and the dialkyltin thiolactic and thiomalic acid esters.

The reaction does not take place with such organotin oxides and thioglycolic acid esters, with the exception of dioctyltin oxide and dioctyltin thioglycolate esters. The fact that these acid esters are both alpha-mercapto acid esters is evidently not a disabling factor in the reaction, contrary to what is said in Canadian Patent No. 794,373, and the reaction is therefore entirely unexpected and inexplicable.

The invention is applicable to any dialkyltin salt of monohydric aliphatic saturated alcohol esters of thiolactic and thiomalic acids in which the alcohol residue has from about one to about eighteen carbon atoms, such as for instance, methyl, ethyl, propyl, isopropyl, butyl, isobutyl, amyl, hexyl, isohexyl, heptyl, octyl, isooctyl, 2-ethylhexyl, nonyl, decyl, undecyl, dodecyl, tridecyl, palmityl, myristyl and stearyl esters of such acids.

If the dialkyltin salt of the thiolactic or thiomalic acid ester is not available, it is also possible to employ a mixture of the stoichiometrically equivalent amounts of the corresponding thiolactate or thiomalate ester (2 moles) and dialkyltin oxide (1 mole), which react in situ to form the dialkyltin bis(thiolactate ester) or bis(thiomalate ester).

The invention is also applicable to any dialkyltin oxides in which the alkyl has from four to eight carbon atoms, such as the dibutyl, isobutyl, and amyl, hexyl, isohexyl, heptyl, octyl, isooctyl and 2-ethylhexyl tin oxides. In addition, the dialkyltin dichlorides can be used, in the presence of alkali, such as sodium or potassium hydroxide, evidently because they form the dialkyltin oxides in situ in the presence of the alkali. Consequently, reference to the dialkyltin oxides will be understood to encompass dialkyltin dichlorides and alkali.

The reaction products are easily prepared by blending and heating a mixture of the dialkyltin oxide and the dialkyltin salt of an alcohol ester of thiolactic or thiomalic acids at an elevated temperature at which reaction occurs within the range from about 50 to about 250° C. and preferably from about 100 to about 200° C. A diluent such as toluene, benzene and xylene can be used, but is unnecessary. The dialkyltin oxide is insoluble in the dialkyltin thiolactic or thiomalic acid ester at the beginning of the reaction, and the progress of the reaction is readily observed by dissolution of the dialkyltin oxide. When all of the dialkyltin oxide has dissolved, and a homogeneous liquid is formed, reaction is essentially complete, but heating can be continued for another half hour to one hour, to ensure that all of the dialkyltin oxide has reacted. The reaction is complete in from thirty minutes to one hour, but longer heating times up to five hours can be used, if desired. These homogeneous liquids are completely compatible with polyvinyl chloride resins in the proportions required for stabilizing effectiveness.

An improvement in the stabilizing effectiveness of the dialkyltin thiolactic or thiomalic acid ester is obtained with the reaction therewith of very small amounts of dibutyltin oxide. As little as 2.0% dibutyltin oxide will enhance the effectiveness of the resulting reaction product in increasing resistance of the resin to the development of early discoloration when heated. There is no upper limit on the amount of dialkyltin oxide that can be reacted, except that imposed by homogeneity of the reaction product; in amounts in excess of about 50%, the homogeneity of the reaction product may be disadvantageously affected; the upper limit is reached when no more dialkyltin oxide dissolves. Preferably from 25 to 40% by weight of dialkyltin oxide is reacted with the dialkyl thiolactic or thiomalic acid ester.

These reaction products have an outstandingly high tin content, for dialkyltin mercaptoacid ester derivatives. The tin content is within the range from about 10% to about 35% tin, depending on the amount of dialkyltin oxide reacted. Products having a tin content of from 15 to 25% are preferred as stabilzers. Consequently, small amounts are quite effective in stabilizing effectiveness. From about 0.1 to about 10% by weight of the resin is usually employed.

The reaction products are useful with all types of polyvinyl chloride resins, in which vinyl chloride is present in the polymer molecule in a major proportion, up to 100%. Thus, polyvinyl chloride homopolymers as well as copolymers of vinyl chloride with other copolymerizable monomers, such as ethylene, vinyl acetate, vinylidene chloride, acrylonitrile, methyl acrylate and acrylic acid can be stabilized by the reaction products of the invention. The polyvinyl chloride resin compositions can also include the usual adjuncts, such as plasticizers, as in semi-rigid and plasticized formulations, the rigid formulations containing less than 10% plasticizer, the semi-rigid formulations containing from 10 to 18% plasticizer, and the highly plasticized formulations containing from 18 to 75% plasticizer. Other stabilizers can be added, as well as antioxidants, such as phenols.

The following examples in the opinion of the inventors represent preferred embodiments of the invention.

EXAMPLE 1

Dibutyltin oxide (41.5 grams) was added to dibutyltin-bis-(monoisooctyl thiolactate) (222 grams) which was heated at 105° C. and stirred for three hours. In the course of the reaction, the dibutyltin oxide (which was initially insoluble), dissolved in the mixture, and a homogeneous, light yellow liquid was formed. The tin content was found to be 22.5%.

The liquid was employed without further processing as a stabilizer in comparison with dibutyltin-bis-(monoisooctyl thiolactate) as a control, on an equal tin weight basis in the following resin formulation:

Parts by weight
Diamond 40, polyvinyl chloride resin homopolymer _____ 100
Blendex 401, styrene-butadiene-acrylonitrile copolymer _____ 10
Wax E lubricant _____ 0.25
Stabilizer _____ Amount shown in Tables I and II The components were blended, and the resulting mixture was then milled and heated on a two-roll mill at 350° F. for five minutes, after which the mixture was homogeneous, and was sheeted off. The resulting sheet was cut into strips, and the strips heated in an oven at 350 and at 375° F. in separate tests, in parallel with like compositions formulated using only the dibutyltin-bis-(monoisooctyl thiolactate) as the stabilizer. The results obtained were noted, and are summarized in Tables I and II.

TABLE I.—350° F.

| Time of heating (minutes) | Control A—dibutyltin-bis(monoisooctyl thiolactate) (17.8% Sn) 2.4 parts | Example 1—reaction product of dibutyltin oxide and dibutyltin-bis-(monoisooctyl thiolactate) (22.5% Sn) 2 parts |
|---|---|---|
| Initial | Colorless | Colorless. |
| 15 | Light yellow | Do. |
| 30 | Yellow | Do. |
| 45 | do | Do. |
| 60 | do | Very pale yellow. |
| 75 | do | Do. |
| 90 | do | Pale yellow. |
| 105 | do | Very light yellow. |
| 120 | do | Light yellow. |

TABLE II.—375° F.

| Time of heating (minutes) | Control A—dibutyltin-bis(monoisooctyl thiolactate) (17.8% Sn) 2.4 parts | Example 1—reaction product of dibutyltin oxide and dibutyltin-bis-(monoisooctyl thiolactate) (22.5% Sn) 2 parts |
|---|---|---|
| Initial | Colorless | Colorless. |
| 15 | Yellow | Do. |
| 30 | do | Very pale yellow. |
| 45 | do | Light yellow. |
| 60 | Yellow-brown edges | Yellow-brown edges. |
| 75 | Brown | Brown. |
| 90 | Very dark brown | Very dark brown. |

It is apparent from the data that the reaction product gives a very significant improved resistance to the development of early discoloration, as compared to dibutyl-bis-(monoisooctyl thiolactate), when tested at both 350° F. and 375° F.

EXAMPLE 2

Dibutyltin oxide (24.9 parts) was added to dibutyltin-bis-(diisooctyl thiomalate) (195 parts) which was heated to 115° C. with stirring, and the temperature maintained for three hours. The dibutyltin oxide initially was insoluble in the mixture, but as the reaction continued, it dissolved, and finally at the conclusion of the reaction time a homogeneous light yellow-liquid was formed. The tin content was found to be 16.1%.

This reaction product was used without further processing as a stabilizer in a polyvinyl chloride resin composition, in parallel to dibutyltin-bis-(diisooctyl thiomalate) as a control. The following formulation was used:

Parts by weight
Diamond 40, polyvinyl chloride resin homopolymer _____ 100
Blendex 401, styrene-butadiene-acrylonitrile copolymer _____ 10
Wax E lubricant _____ 0.25
Stabilizer _____ Amount shown in Tables III and IV The components were blended, and the resulting mixture was then milled and heated on a two-roll mill at 350° F. for five minutes, after which the mixture was homogeneous, and was sheeted off. The resulting sheet was cut into strips, and the strips heated in an oven at 350 and at 375° F. in separate tests, in parallel with like compositions formulated using only the dibutyltin-bis-(diisooctyl thiomalate) as the stabilizer. The results obtained were noted, and are summarized in Tables III and IV.

TABLE III.—350° F.

| Time of heating (minutes) | Control B—Dibutyltin-bis-(diisooctyl thiomalate) (12.1% Sn) 3.6 parts | Example 2—Reaction product of dibutyltin oxide and dibutyltin-bis-(diisooctyl thiomalate) (16.1% Sn) 2.3 parts |
|---|---|---|
| Initial | Cloudy, colorless | Clear, colorless. |
| 15 | do | Do. |
| 30 | Cloudy, very pale yellow | Do. |
| 45 | Cloudy, pale yellow | Do. |
| 60 | Cloudy, light yellow | Clear, very pale yellow. |
| 75 | do | Do. |
| 90 | Cloudy, yellow | Clear, light yellow. |
| 105 | do | Clear, yellow. |
| 120 | do | Do. |

TABLE IV.—375° F.

| Time of heating (minutes) | Control B—Dibutyltin-bis-(diisooctyl thiomalate) (12.1% Sn) 3.6 parts | Example 2—Reaction product of dibutyltin oxide and dibutyltin-bis-(diisooctyl thiomalate) (16.1% Sn) 2.3 parts |
|---|---|---|
| Initial | Colorless | Colorless. |
| 15 | Cloudy, pale yellow | Clear, very pale yellow. |
| 30 | Cloudy, light yellow | Do. |
| 45 | Cloudy, yellow | Clear, pale yellow. |
| 60 | do | Clear, yellow. |
| 75 | Cloudy, dark yellow | Clear, dark yellow. |
| 90 | Cloudy, very dark yellow | Clear, very dark yellow. |
| 105 | Reddish brown | Reddish brown. |
| 120 | Dark brown | Dark brown. |

It is apparent from the data that the reaction product gives an improved resistance to the development of early discoloration, as compared to dibutyltin-bis-(diisooctyl thiomalate), when tested at both 350° F. and 375° F.

Having regard to the foregoing closure, the following is claimed as the inventive and patentable embodiments thereof:

1. A homogeneous liquid reaction product containing from about 10% to about 35% tin, that is compatible with polyvinyl chloride resins, and that is a particularly effective polyvinyl chloride resin stabilizer, comprising the product of the reaction at from about 50 to about 250° C. of a dialkyltin oxide in which the alkyl has from four to eight carbon atoms, with a dialkyltin monohydric aliphatic saturated alcohol ester of thiolactic or thiomalic acid in which the alcohol residue has from about one to about eighteen carbon atoms.

2. A reaction product according to claim 1 in which the dialkyltin thiolactate or thiomalate ester is an ester of an alcohol having from four to twelve carbon atoms.

3. A reaction product according to claim 2 in which the dialkyltin ester is a dibutyltin bis-(octyl thiolactate) or dibutylthin bis-(octyl thiomalate) ester.

4. A reaction product according to claim 1 in which the amount of dialykyltin oxide is at least 2% up to about 50% by weight of the reaction product.

5. A reaction product according to claim 1 in which the amount of dialkyltin oxide is at least 5% up to about 40% by weight of the reaction product.

6. A reaction product according to claim 1 in which the tin content is from about 15% to about 25%.

7. A reaction product according to claim 1 in which the dialkyltin oxide is derived from dialkyltin dichloride and alkali.

8. A process for preparing a reaction product according to claim 1, which comprises blending the dialkyltin oxide and the dialkyltin thiolactate or thiomalate ester, and heating the mixture at from about 50 to about 250° C. until a homogeneous liquid is formed.

9. A process according to claim 8, in which a thiolactate or thiomalate ester and the stoichiometrically equivalent amount of dialkyltin oxide are used instead of the dialkyltin thiolactate or thiomalate ester.

10. A process according to claim 8, in which a dialkyltin dichloride and alkali are used as the source of dialkyltin oxide.

References Cited
UNITED STATES PATENTS

| | | | |
|---|---|---|---|
| 2,789,102 | 4/1957 | Weinberg | 260—429.7 X |
| 3,478,071 | 11/1969 | Weisfeld | 260—429.7 |

TOBIAS E. LEVOW, Primary Examiner

W. F. W. BELLAMY, Assistant Examiner

U.S. Cl. X.R.

260—45.75 K

PO-1050
(5/69)

UNITED STATES PATENT OFFICE
CERTIFICATE OF CORRECTION

Patent No. 3,642,848        Dated February 15, 1972

Inventor(s) Lawrence R. Brecker et al.

It is certified that error appears in the above-identified patent and that said Letters Patent are hereby corrected as shown below:

Column 4, line 28     :     "dibutyl-bis" should be -- dibutyltin-bis --

Column 5, Table IV, 2nd and 3rd column headings     :     "(12.1 a/c Sn)" should be -- (12.1 % Sn) --

:     "(16.1 a/c Sn)" should be -- (16.1 % Sn) --

Column 5, line 16     :     "(diisoctyl" should be -- (diisooctyl --

Column 5, line 18     :     "closure" should be -- disclosure --

Column 5, line 36     :     "dibutylthin" should be -- dibutyltin --

Column 5, line 38     :     "dialykyltin" should be -- dialkyltin --

Signed and sealed this 27th day of March 1973.

(SEAL)
Attest:

EDWARD M. FLETCHER, JR.
Attesting Officer

ROBERT GOTTSCHALK
Commissioner of Patents